(12) United States Patent
Hahn

(10) Patent No.: US 9,284,437 B2
(45) Date of Patent: Mar. 15, 2016

(54) RUBBER COMPOUND AND TIRE WITH COMPONENT

(71) Applicant: The Goodyear Tire & Rubber Company, Akron, OH (US)

(72) Inventor: Bruce Raymond Hahn, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 667 days.

(21) Appl. No.: 13/721,559

(22) Filed: Dec. 20, 2012

(65) Prior Publication Data

US 2014/0179837 A1  Jun. 26, 2014

(51) Int. Cl.

| C08L 7/00 | (2006.01) |
|---|---|
| B60C 1/00 | (2006.01) |
| C08L 21/00 | (2006.01) |
| C08L 61/04 | (2006.01) |
| C08K 7/02 | (2006.01) |
| C08K 3/00 | (2006.01) |
| C08K 3/04 | (2006.01) |

(52) U.S. Cl.
CPC ... *C08L 7/00* (2013.01); *B60C 1/00* (2013.01); *C08K 3/0033* (2013.01); *C08K 3/04* (2013.01); *C08K 7/02* (2013.01); *C08L 21/00* (2013.01); *C08L 61/04* (2013.01)

(58) Field of Classification Search
CPC ........... C08L 7/00; C08L 21/00; C08L 61/04; C08K 7/02; C08K 3/0033; C08K 3/04; B60C 1/00
USPC ........................................................ 524/236
See application file for complete search history.

(56) References Cited

U.S. PATENT DOCUMENTS

| 3,517,722 A | 6/1970 | Endter et al. | |
|---|---|---|---|
| 4,605,696 A | 8/1986 | Benko et al. | 524/432 |
| 5,064,901 A | 11/1991 | Machado | 525/92 |
| 5,206,289 A | 4/1993 | Sinsky et al. | 525/114 |
| 5,886,074 A | 3/1999 | Sandstrom et al. | 524/291 |
| 6,255,379 B1 | 7/2001 | Hahn et al. | 524/492 |
| 7,249,621 B2 | 7/2007 | Sandstrom | 152/209.4 |
| 8,242,194 B2 | 8/2012 | Sandstrom | 524/300 |
| 2008/0115874 A1 * | 5/2008 | Thielen | B60C 1/00 152/541 |
| 2013/0078477 A1 * | 3/2013 | Shibata | B32B 25/08 428/475.5 |

FOREIGN PATENT DOCUMENTS

JP  2011046819 A  *  3/2011

* cited by examiner

*Primary Examiner* — Angela C Scott

(74) *Attorney, Agent, or Firm* — Henry C. Young, Jr.

(57) ABSTRACT

The invention relates to a rubber composition with a stiffness property promoted by combination of short fibers and resin product of a methylene donor and a methylene acceptor, where at least a portion of the methylene acceptor is comprised of expoxidized phenol formaldehyde, and to a tire with a component comprised of such rubber composition.

20 Claims, 2 Drawing Sheets

RUBBER COMPOUND AND TIRE WITH COMPONENT

FIELD OF INVENTION

The invention relates to a rubber composition with a stiffness property promoted by combination of short fibers and resin product of a methylene donor and a methylene acceptor, where at least a portion of the methylene acceptor is comprised of expoxidized phenol formaldehyde, and to a tire with a component comprised of such rubber composition.

BACKGROUND OF THE INVENTION

It is sometimes desired to promote stiffness for a rubber composition, particularly for a tire component such as for example a tire tread, sidewall apex and sidewall insert.

In practice, stiffness of various rubber components of a tire may desirable to promote handling of the tire such as, for example, steering and cornering.

Historically, stiffness of rubber compositions, particularly cured rubber composition containing diene-based elastomers, may be promoted, for example, by an inclusion of a dispersion of various short fibers and by inclusion of a resin product of methylene donor and methylene acceptor and by providing an increase in reinforcing filler content.

However, hysteresis of a rubber composition may also normally promoted as evidenced by an decrease in its rebound and an increase in its tan delta, physical properties which, in turn, promotes an increase in its internal heat generation, and an accompanying temperature rise, as the rubber composition is being worked as in a component of a tire during service and operation of the tire.

An indication of stiffness of a sulfur cured rubber composition may be evidenced by one or more of the rubber composition's physical properties such as, for example, storage modulus (G'), and tensile modulus (e.g. 300 percent modulus).

For this invention, it is desired to evaluate increasing stiffness of a rubber composition without significantly increasing its hysteresis, namely without making the rubber composition significantly more hysteretic.

It is desired to evaluate promoting stiffness of a cured rubber composition by inclusion of a dispersion of short fibers together with resin product of a methylene donor and a methylene acceptor where at least a portion of the methylene acceptor is comprised of epoxidized phenol formaldehyde polymer.

For this evaluation, the resin product may be provided as a reaction product of the methylene donor and methylene acceptor in situ within the rubber composition or as a product of a pre-formed initial resin thereof with a molar deficiency of the methylene donor followed by reaction therewith by the same or different methylene donor in situ within the rubber composition so long as with the methylene acceptor reacted in situ within the rubber composition is comprised of an epoxidized phenol formaldehyde polymer.

In the description of this invention, the term "phr" relates to parts by weight for a material or ingredient per 100 parts by weight elastomer(s)". The terms "rubber" and "elastomer" may be used interchangeably unless otherwise indicated. The terms "cure" and "vulcanize" may be used interchangeably unless otherwise indicated.

SUMMARY AND PRACTICE OF THE INVENTION

In accordance with this invention, a rubber composition is provided which is comprised of, based upon parts by weight per 100 parts by weight of rubber (phr):

(A) at least one diene-based elastomer,
(B) about 30 to about 120, alternately from about 50 to about 120 phr of particulate reinforcing filler comprised of:
  (1) rubber reinforcing carbon black,
  (2) precipitated silica, (normally together with a silica coupling agent) or
  (3) a combination of precipitated silica and rubber reinforcing carbon black, for example containing up to about 90 phr of rubber reinforcing carbon black (normally together with a silica coupling agent);
(C) about 1 to about 10, alternately about 1 to about 6, phr of short fiber reinforcement, and
(D) resin product of methylene donor compound and methylene acceptor compound, wherein said resin product is provided as:
  (1) a reaction product of the methylene donor and methylene acceptor in situ within the rubber composition, or
  (2) a first pre-formed initial resin product (exclusive of said rubber composition, namely prior to addition to said rubber composition) of a methylene donor and methylene acceptor with a molar deficiency of the methylene donor (which may therefore sometimes be referred to as being a reactive resin product) followed by reaction of said initial resin with the same or different methylene donor in situ within the rubber composition,
  wherein the methylene acceptor for said pre-formed initial resin is comprised of at least one of epoxidized phenol formaldehyde resin, epoxidized novolac resin, epoxidized resorcinol, epoxidized phenol, epoxidized alklated phenol, epoxidized cresol and epoxidized cashew nut shell oil, particularly an expoxidized phenol formaldehyde resin, or
  (3) a second pre-formed initial resin product of a methylene donor and methylene acceptor modified with epichlorohydrin to form an epoxidized initial resin followed by crosslinking said pre-formed initial resin with a methylene donor in situ within the rubber composition,
  wherein the methylene acceptor for said second pre-formed initial resin is comprised of at least one of phenol formaldehyde resin, novolac resin, resorcinol, phenol, alklated phenol, cresol and cashew nut shell oil, particularly phenol formaldehyde resin,
  wherein the methylene acceptor reacted in situ within the rubber composition with said methylene donor or with said first or second pre-formed initial resin product in situ within the rubber composition is comprised of an epoxidized phenol formaldehyde polymer;
  wherein said methylene donor, namely at least one compound capable of librating methylene groups, is comprised of, for example, at least one of hexamethylenetetramine, hexamethoxymethylmelamine, lauryloxymethylpyridinium chloride, ethyloxymethylpyridinium chloride and trioxanhexamethylolmelamine, particularly at least one of hexamethylenetetramine, hexamethoxymethylmelamine.

The epoxidized phenol formaldehyde methylene acceptor compound is a phenol formaldehyde resin having from about 15 to about 30 percent epoxidation content, alternatively in a range of from about 20 to about 28 percent epoxidation.

The short fibers may be mono-filament or a poly-filament fibers comprised of at least one of, for example, polyaramide, polyester, polyamide and cellulose (for example, comprised of at least one of cotton and jute) filaments. In general, polyaramide fibers are desired for the practice of this invention. Such short fibers may, for example, have an average length of from about 0.2 to about 2, alternately about 0.5 to about 1, mm.

In practice, the resin product of methylene acceptor compound and methylene donor compound may desirably be said second pre-formed initial resin product formed from a methylene donor and a methylene acceptor which can undergo further reaction with epichlorohydrin to form the epoxidized resin and can again undergo a further crosslinking reaction with a methylene donor (for example hexamethylenetetramine or hexamethoxymethylmelamine) in situ within the rubber composition, for example by addition of the second pre-formed initial epoxidized resin product and a methylene donor, such as, for example hexamethylmethylenetetramine or hexamethoxymethylmelamine, individually to the rubber composition.

Alternatively, the resin product may also be formed in-situ within the rubber composition by addition of the methylene acceptor and methylene donor (the epoxidized phenol formaldehyde) individually to the rubber composition.

For examples of formation and use of a resin product of methylene acceptor and methylene donor compound see U.S. Pat. Nos. 3,517,722, 4,605,696, 5,206,289, 5,886,074 and 7,249,621.

In the practice, the rubber composition may be comprised of various conjugated diene-based elastomers Such diene-based elastomers may be, for example, at least one of polymers comprised of at least one of isoprene and 1,3-butadiene, and styrene with at least one of isoprene and 1,3-butadiene.

Representative of such diene-based elastomers are, for example, natural cis 1,4-polyisoprene rubber, synthetic cis 1,4-polyisoprene rubber, cis 1,4-polybutadiene rubber, high vinyl polybutadiene rubber having a vinyl 1,2 content in a range of about 10 percent to about 90 percent, styrene/butadiene copolymer (SBR) rubber (aqueous emulsion or organic solution polymerization prepared copolymers) and styrene/isoprene/butadiene terpolymer rubber.

In practice, one or more of such diene-based elastomers may be tin of silicon coupled (elastomer chains coupled to each other) such as for example, organic solution polymerization prepared tin or silicon coupled styrene/butadiene copolymers. For example, see U.S. Pat. No. 5,064,901.

In practice, one or more of such diene-based elastomers may be functionalized elastomers in a sense of containing at least one functional group reactive with hydroxyl groups (e.g. silanol groups) on precipitated silicas comprised of, for example one or more of amine, hydroxyl, carboxyl, siloxy and imine groups.

Accordingly, at least one of said diene-based elastomer(s) may, for example:

(A) be a tin or silicon coupled elastomer, or (B) may contain at least one functional group reactive with hydroxyl groups contained on precipitated silica comprised of one or more of amine, hydroxyl, carboxyl, siloxy and imine groups, or (C) be a tin or silicon coupled elastomer which contains at least one functional group reactive with hydroxyl groups contained on precipitated silica comprised of one or more of amine, hydroxyl, carboxyl, siloxy and imine groups.

Various commercially available amorphous synthetic precipitated silicas (precipitated silicas) may be used for the precipitated silicas for this invention. Such silicas may be characterized, for example, by their BET surface areas. Representative of such silicas, for example only and without limitation, are silicas from PPG Industries under the Hi-Sil trademark with designations 210, 243, etc.; silicas from Rhodia, with designations of Zeosil 1165MP and Zeosil 165GR, silicas from Evonic with designations VN2 and VN3, and silicas from Huber such as Zeopol 8745 and Zeopol 8715.

A silica coupling agent would conventionally be used to couple the precipitated silica to the diene-based elastomer(s) of the containing rubber composition. Such silica couplers have a moiety reactive with hydroxyl groups (e.g. silanol groups) contained on the precipitated silica and another different moiety interactive with the diene-based elastomer(s) of the rubber composition.

Representative of such silica coupling agents are comprised of, for example, bis(3-alkoxysilylalkyl)polysulfides having an average of from about 2 to about 4 connecting sulfur atoms in their polysulfidic bridge, representative of which is comprised of a bis(3-triethoxysilyl propyl)polysulfide as well as an organoalkoxymercaptosilane. Silica coupling agents are well known for use to aid precipitated silica reinforcement for diene-based elastomers.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins and plasticizers, fillers, pigments, fatty acid, zinc oxide, waxes, antioxidants and antiozonants, peptizing agents and reinforcing materials.

The presence and relative amounts of the above additives are not considered to be an aspect of the present invention, unless otherwise indicated, which is more primarily directed to a tire with a rubber component such as, for example, a tread cap rubber layer (which contains the tread running surface), tread base rubber layer underlying a tread cap rubber layer and sidewall apex or sidewall insert of a rubber composition containing the combination of short fibers and resin product of methylene acceptor and methylene donor, of which at least a portion of the methylene acceptor is an epoxidized phenol formaldehyde polymer.

The tires can be built, shaped, molded and cured by various methods which will be readily apparent to those having skill in such art.

The following Example is provided to further understand the invention. The parts and percentages are by weight unless otherwise indicated.

EXAMPLE I

Experiments were conducted with a natural rubber based rubber composition to evaluate an inclusion of short fibers (e.g. in a form of polyaramid fibers) together with a resin product of a methylene donor and methylene acceptor compound wherein at least a portion of the methylene acceptor compound is an epoxidized phenol formaldehyde resin.

For the methylene donor compound, hexamethylenetetramine was used.

A First Series and Second Series of experiments were conducted to comparatively evaluate use of phenol formaldehyde resin and use of phenol formaldehyde resin which was expoxidized for the methylene acceptor.

The First Series of experiments was conducted comprised of:

(1) a Control rubber Sample A (Control 1) comprised of natural rubber (cis 1,4-polyisprene) containing a resin product of hexamethylenetetramine and phenol formaldehyde resin, and (2) experimental rubber Samples B and C similar to Control rubber Sample A except that rubber Samples B and C contained 2 percent and 4 percent, respectively, of short polyaramid fibers.

The Second Series of experiments was conducted comprised of:

(1) a Control rubber Sample D (Control 2) comprised of natural rubber (cis 1,4-polyisoprene) containing a resin product of hexamethylenetetramine and epoxidized phenol formaldehyde resin, and (2) experimental rubber Samples E and F similar to Control rubber Sample D except that Samples E and F contained 2 percent and 4 percent, respectively, of short polyaramid fibers.

The rubber Samples were prepared by mixing the natural rubber with ingredients in an initial non-productive mixing step followed by a sequential non-productive mixing stage (NP) in an internal rubber mixer (Banbury rubber mixer) to about 160° C. The rubber compositions were subsequently mixed in a productive mixing stage (P) in an internal rubber mixer (Banbury mixer) with a sulfur cure package, namely sulfur and sulfur cure accelerator(s), to a drop temperature of, for example, about 115° C. The rubber compositions were removed from the internal mixer after each mixing step and cooled to below 40° C. between each of the non-productive mixing stage and final productive mixing stage.

The basic formulation for the rubber Samples is presented in the following Table 1 expressed in parts by weight per 100 parts of rubber (phr) unless otherwise indicated.

TABLE 1

| | Parts by weight (phr) |
|---|---|
| Non-Productive Mixing Stage (NP1) | |
| Natural cis 1,4-polyisoprene rubber[1] | 100 |
| Reactive phenol formaldehyde resin (methylene acceptor compound)[2] | 0 and 10 |
| Reactive epoxidized phenol formaldehyde resin (methylene acceptor compound)[3] | 0 and 10 |
| Polyaramid short fibers[4] | 0, 2 and 4 |
| Carbon black, rubber reinforcing[5] | 50 |
| Rubber processing oil[6] | 7 |
| Fatty acid[7] | 2 |
| Zinc oxide | 5 |
| Productive Mixing Stage (P) | |
| Sulfur | 3 |
| Sulfur vulcanization accelerator(s)[8] | 1.2 |
| Hexamethylenetetramine (methylene donor compound) | 3 |

[1]Natural rubber as SMR20
[2]Pre-formed reactive resin product of methylene donor and methylene acceptor compound (without epoxidization) with a molar deficiency of methylene donor compound as Alnovol PN320 from Cytec
[3]Pre-formed reactive epoxidized resin product of methylene donor and methylene acceptor compound with a molar deficiency of methylene donor compound as DEN 438 ™ from Dow Chemical
[4]Obtained as aramid Kevlar GF22 ™ short fibers from DuPont having an average length of about 0.5 to about 1 mm
[5]Rubber reinforcing carbon black as N326, an ASTM designation
[6]Naphthenic/paraffinic medium rubber processing oil
[7]Primarily comprised of stearic, palmitic and oleic acids
[8]Sulfenamide and diphenyl guanidine sulfur cure accelerators The following Table 2 reports data for said First Series and said Second series of experiments, namely data for cure behavior and various physical properties of rubber compositions based on the formulation of Table 1, particularly Modulus, Storage Modulus (G') and Tan Delta at ranges of elongations or strains.

Data for the First Series of data is reported for Control rubber Sample A (Control 1) together with Experimental rubber Samples B and C.

Data for the Second Series of data is reported for Control rubber Sample D (Control 2) together with Experimental rubber Samples E and F.

Where cured rubber samples are examined the rubber Samples were cured for about 30 minutes at a temperature of about 150° C.

TABLE 2

| | Parts (phr) | | | | | |
|---|---|---|---|---|---|---|
| | Control 1 | Experimental | | Control 2 | Experimental | |
| | A | B | C | D | E | F |
| Materials (phr) | | | | | | |
| Natural rubber | 100 | 100 | 100 | 100 | 100 | 100 |
| Phenol formaldehyde resin | 10 | 10 | 10 | 0 | 0 | 0 |
| Epoxidized Resin | 0 | 0 | 0 | 10 | 10 | 10 |
| Short Fibers | 0 | 2 | 4 | 0 | 2 | 4 |
| MDR Rheometer (150° C.) | | | | | | |
| S' Max − S' Min (dNm) | 24.8 | 28.1 | 29.5 | 19.5 | 20.7 | 23.2 |
| T90 (minutes) | 8.3 | 7.9 | 8 | 7.8 | 7.7 | 7.8 |
| RPA, (Rubber Process Analyzer) 100° C., 0.83 Hertz, uncured, storage modulus G', (MPa) | | | | | | |
| 15 percent strain, | 156 | 134.4 | 167.5 | 139.4 | 164.3 | 209.8 |
| RPA (Rubber Process Analyzer) 100° C., strain sweep, 0.5 Hertz, cured, storage modulus G' (MPa) | | | | | | |
| 0.56% strain | 3001.9 | 3816.7 | 3976.4 | 4227.9 | 4434.4 | 5271.2 |
| 0.7% strain | 2950.8 | 3712 | 3870.4 | 4136.6 | 4336.3 | 5125.9 |
| 0.98% strain | 2887 | 3639.5 | 3798.5 | 4018.7 | 4190.3 | 4966.3 |
| 1.95% strain | 2795.4 | 3470.6 | 3600.9 | 3695.2 | 3855 | 4551 |
| 3.07% strain | 2687.4 | 3296.1 | 3436.2 | 3373 | 3530.8 | 4103.9 |
| Tan delta | | | | | | |
| tan delta, 0.56% strain | 0.02 | 0.03 | 0.03 | 0.08 | 0.07 | 0.07 |
| tan delta, 0.7% strain | 0.02 | 0.03 | 0.03 | 0.08 | 0.08 | 0.08 |

TABLE 2-continued

| | Parts (phr) | | | | | |
|---|---|---|---|---|---|---|
| | Control 1 | Experimental | | Control 2 | Experimental | |
| | A | B | C | D | E | F |
| tan delta, 0.98% strain | 0.03 | 0.03 | 0.03 | 0.09 | 0.09 | 0.08 |
| tan delta, 1.95% strain | 0.03 | 0.04 | 0.04 | 0.11 | 0.10 | 0.10 |
| tan delta, 3.07% strain | 0.04 | 0.05 | 0.05 | 0.12 | 0.12 | 0.12 |
| Tensile Data (cure 30 minutes, 150° C.) | | | | | | |
| 10% modulus, (MPa) | 0.7 | 1.9 | 2 | 0.9 | 1.7 | 2.2 |
| 25% modulus, (MPa) | 1.1 | 2.9 | 3.5 | 1.4 | 2.8 | 3.9 |
| 50% modulus, (MPa) | 1.9 | 3.9 | 5 | 2.1 | 4.3 | 6 |
| 100% modulus, (MPa) | 3.7 | 5.6 | 6.8 | 3.8 | 6.3 | 8.1 |
| 200% modulus, (MPa) | 7.7 | 9 | 9.5 | 8.6 | 10.4 | 11.3 |
| 300% modulus, (MPa) | 12.5 | 12.8 | NA* | 14.7 | 15.3 | NA* |
| Tensile stress at break, (MPa) | 15.7 | 13.3 | 12 | 18.2 | 15.6 | 14.1 |
| Elongation at break (%) | 358.3 | 298.9 | 280.4 | 363.3 | 304.5 | 272.4 |

*the term NA means that the rubber sample broke prior to its 300 percent elongation

DESCRIPTION OF THE DRAWINGS

In the Drawings.

FIG. 1 illustrates a plot of Stress (Tensile Modulus) versus Elongation (percent) for the individual Control and Experimental rubber Samples for both of the First Series (Samples A and B) and the Second Series (Samples D and E) of the experiments.

FIG. 1A is an enlarged portion of FIG. 1 to illustrate Tensile Modulus values at low Elongation.

FIG. 2 illustrates a plot of relative Tan Delta values versus Strain (percent) for the individual Control and Experimental rubber Samples for the First Series (Samples A and B) and for the Second Series (Samples D and E) of the experiments.

DISCUSSION

Figure 1:
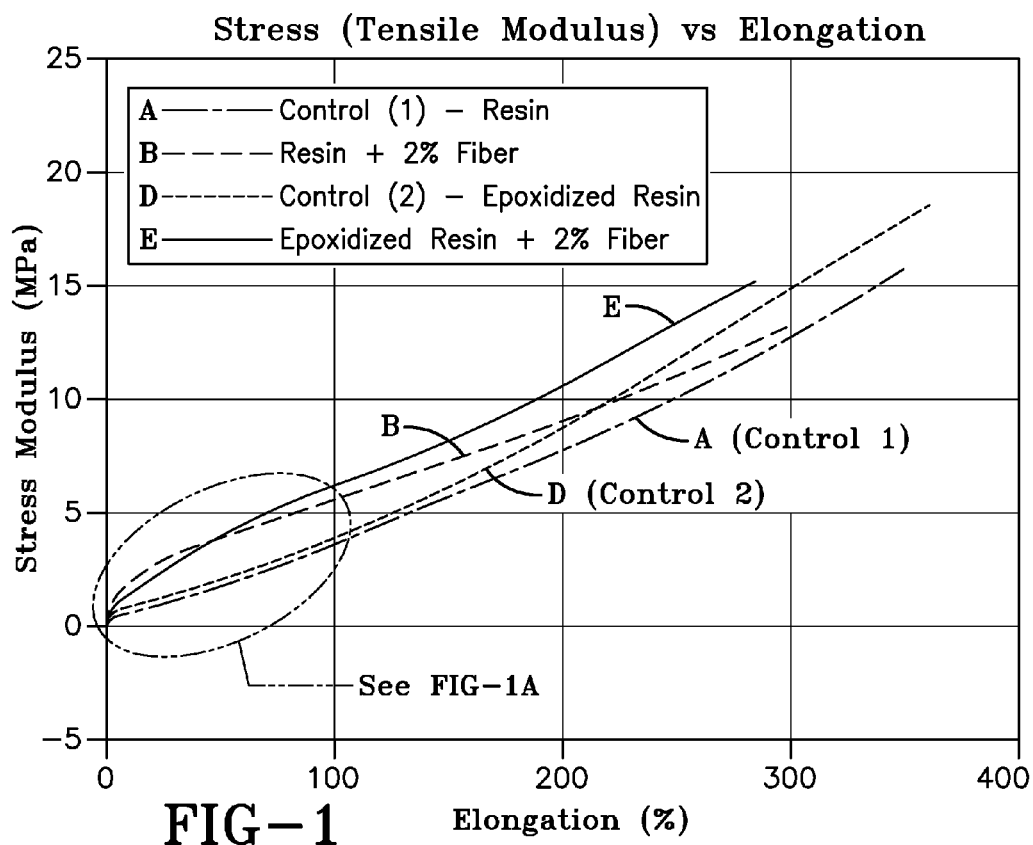
FIGS. 1, 1A and 2 represent physical data taken from Table 2 for the First Series of Experiments (for Samples A and B) and the Second Series of Experiments (for Samples D and E).

For FIG. 1: For the First Series of Experiments (Samples A and B):

From the plotted Tensile Modulus curves in FIG. 1, it can be seen that Experimental rubber Sample B has a somewhat higher tensile modulus value than its associated Control rubber Sample A as the elongation of the rubber Samples is increased.

Figure 1A:
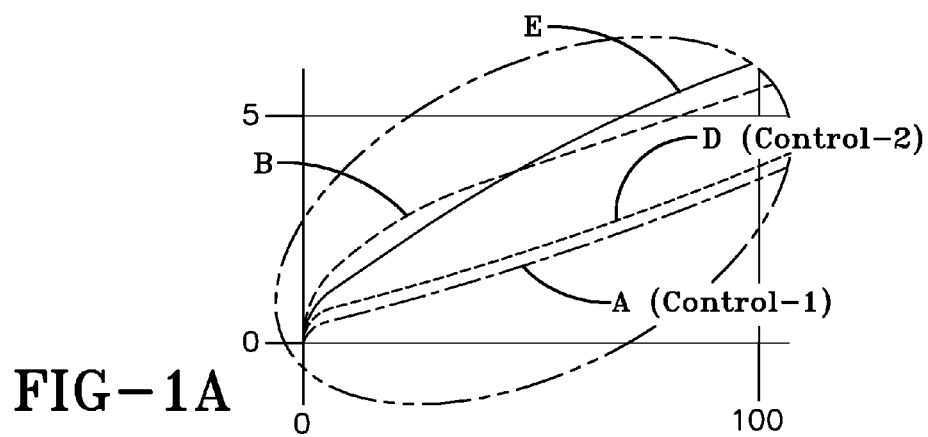

It can further be seen that, from the plotted tensile modulus curve, Experimental rubber Sample B has a small inflection (e.g. inflection point) in the in region of about 30 to about 50 percent elongation (FIG. 1A enlarges this area of the graph of FIG. 1). It can be seen that, after this inflection, as the elongation increases, the slope of Sample B is about equal to or lower than that of its Control rubber Sample A. This is indicative that, at the low elongations below the inflection shown in the Figures, the short fibers provide reinforcement for the rubber composition and that, however, after the aforesaid inflection, as the elongation increases above the aforesaid 30 to 50 percent, the reinforcement effect of the short fibers is not as large.

This is considered to be significant in a sense of demonstrating that the ability to maintain short fiber reinforcement for the rubber composition without the presence of the epoxidized phenol formaldehyde created resin product is primarily limited to low elongation of the rubber composition below about 30 to 50 percent elongation.

For FIG. 1: For the Second Series of Experiments (Samples D and E)

From the plotted Tensile Modulus curves in FIG. 1 it can be seen that rubber Experimental rubber Sample E has a consistently and increasingly higher tensile modulus than its Control rubber Sample D as the elongation of the rubber Samples is increased.

It can further be seen that from the plotted tensile modulus curve, Experimental rubber Sample E has a very small inflection in the region of about 80 to 100 percent elongation range. (FIG. 1A enlarges this portion of the graph of FIG. 1.) It can further be seen that the slope of the plot of tensile elongation of rubber Sample E changes very little after the aforesaid inflection as its elongation increases.

This is considered to be significant in a sense of demonstrating the short fiber reinforcement obtained with Experimental rubber Sample E is maintained at significantly higher elongation level than Sample B of the First Series of experiments. This is significant in a sense that a tire component comprised of Experimental rubber Sample E would be able to maintain its stiffness even when subjected to higher elongation than for Sample B.

Conclusion Based on FIG. 1

From the Tensile Modulus versus Elongation curves of FIG. 1, it is clear that the slope of the curve presented for Experimental rubber Sample E (containing both epoxidized phenol formaldehyde based resin together with short polyaramid fibers) increased at a significant rate and with a slope greater than the slope of the curve presented for Experimental rubber Sample B (containing phenol formaldehyde based resin without epoxidation together with short polyaramid fibers) as the elongation of the rubber Samples is increased.

This is indicative that a tire component containing the resin product of epoxidized methylene acceptor and methylene donor together with the short polyaramid fibers would maintain its stiffness at the higher elongations as well as, or better than, a tire component comprised of the Experimental rubber Sample B which did not contain the epoxidized phenol formaldehyde created resin product when subjected to the higher elongation.

Figure 2:
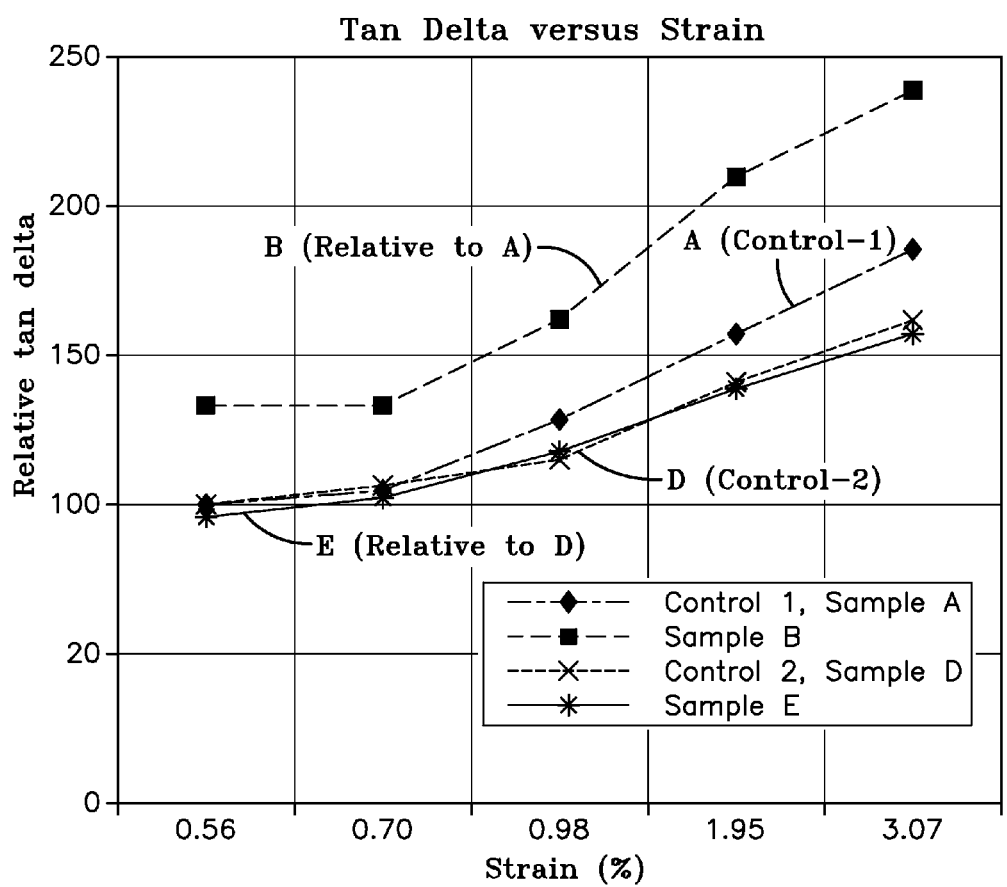

For FIG. 2: Relative Tan Delta Values

In FIG. 2, by the term "relative" Tan Delta values, it is meant that the initial Tan Delta values at 0.56 percent strain for each of Control rubber Samples A and D for said First and Second Series of experiments are normalized to a value of 100.

The Tan Delta values for the remainder of the data for said Control rubber Samples A and D are plotted on their individual separate curves relative to their aforesaid individual normalized individual initial Tan Delta values at 0.56 percent strain as their individual strain values are increased.

The Tan Delta values for the Experimental rubber Samples B and E are also individually plotted relative to the Tan Delta values of their respective Control rubber Samples A and D.

In Summary, for the Relative Tan Delta Values of FIG. 2:

(1) For the First Series of Experiments (Samples A and B), the Tan Delta data for Experimental rubber Sample B is plotted relative to Control rubber Sample A for which its initial Tan Delta data at 0.56 percent strain was normalized to a value of 100. In this manner, then, data for Experimental rubber Sample B and for Control rubber Sample A is plotted relative to data for Control rubber Sample A beginning at their individual 0.56 percent strain values.

(2) For the Second Series of Experiments (Samples D and E), the Tan Delta data for Experimental rubber Sample E is plotted relative to Control rubber Sample D for which its initial Tan Delta data at 0.56 percent strain was normalized to a value of 100. In this manner, then, data for Experimental rubber Sample E and for Control Sample D is plotted relative to normalized data for Control rubber Sample D beginning at their individual 0.56 percent strain values.

Discussion for Data Reported in FIG. 2:

In FIG. 2 it can be seen that the tan delta values of Experimental rubber Sample B are higher that its Control rubber Sample A at all strain levels measured.

This is considered to be significant in a sense of the tan delta values are an indicator of hysteresis of the rubber composition and therefore predictive of the effect of the rubber composition on tire rolling resistance for a tire tread composed of such rubber composition, in a sense that with the lower the tan delta the lower the lower predictive hysteresis of the rubber composition and an accompanying predictive and beneficial lower tire rolling resistance.

In the case of Experimental rubber Sample B, however a tire component (e.g. tread) of such rubber composition would predicatively exhibit an increased hysteresis property and an accompanying predictive increase the tire rolling resistance.

In FIG. 2 it is also seen that Experimental rubber Sample E has a tan delta roughly the same as its Control Sample D.

This is considered to be significant in a sense of the rolling resistance of a tire with a tread component composed of Experimental rubber Sample E would be the same or similar as a tire with its Control rubber Sample D, even though the stiffness of Experimental rubber Sample E is much higher.

It is concluded that Experimental rubber Sample E which contained both the short fibers and an epoxidized phenol formaldehyde resin product would maintain a higher level of stiffness than Experimental rubber Sample B which contained a combination of the short fibers and non-epoxidized phenol formaldehyde resin product. It can also be concluded that the tan delta increase when adding short fibers to the rubber composition together with the with the epoxidized phenol formaldehyde resin product is lower than the tan delta increase when adding short fibers to the rubber composition with the non-epoxidized phenol formaldehyde resin product.

While specific embodiments of the invention have been described, those skilled in the art will recognize that the invention may be variously modified and practiced without departing from the spirit of the invention.

What is claimed is:

1. A rubber composition comprised of, based upon parts by weight per 100 parts by weight of rubber (phr):

(A) at least one diene-based elastomer comprised of at least one of polymers comprised of at least one of isoprene and 1,3-butadiene and of styrene with at least one of isoprene and 1,3-butadiene, (B) about 30 to about 120 phr of particulate reinforcing filler comprised of:
(1) rubber reinforcing carbon black,
(2) precipitated silica, or
(3) a combination of precipitated silica and rubber reinforcing carbon black;

(C) about 1 to about 10 phr of short fiber reinforcement comprised of at least one of polyaramid, polyamide, polyester and cellulose filaments, and (D) resin product of methylene donor compound and methylene acceptor compound, wherein said resin product is provided as:
(1) a reaction product of the methylene donor and methylene acceptor in situ within the rubber composition, wherein said methylene acceptor is an epoxidized phenol formaldehyde polymer, or
(2) reaction product of
(a) a first pre-formed initial resin product of methylene donor and methylene acceptor with a molar deficiency of the methylene donor, prior to addition to said rubber composition, and
(b) methylene donor in situ within the rubber composition;
wherein the methylene acceptor for said first pre-formed initial resin is comprised of at least one of epoxidized phenol formaldehyde resin, epoxidized novolac resin, and epoxidized cashew nut shell oil, or
(3) a second pre-formed initial resin product of a methylene donor and methylene acceptor modified with epichlorohydrin to form an epoxidized initial resin followed by crosslinking said pre-formed initial resin with a methylene donor in situ within the rubber composition,
wherein the methylene acceptor for said second pre-formed initial resin is comprised of at least one of phenol formaldehyde resin, novolac resin, resorcinol, phenol, alklated phenol, cresol and cashew nut shell oil,
wherein said methylene donor is comprised of at least one of hexamethylenetetramine, hexamethoxymethylmelamine, lauryloxymethylpyridinium chloride, ethyloxymethylpyridinium chloride and trioxanhexamethylolmelamine.

2. The rubber composition of claim 1 wherein said methylene donor is comprised of at least one of hexamethylenetetramine and hexamethoxymethylmelamine.

3. The rubber composition of claim 1 wherein said resin product of methylene donor and methylene acceptor is a reaction product of the methylene donor and methylene acceptor in situ within the rubber composition where said methylene acceptor is an epoxidized phenol formaldehyde having an epoxidation content in a range from about 15 to about 30 percent and where said methylene donor is comprised of at least one of hexamethylenetetramine and hexamethoxymethylmelamine.

4. The rubber composition of claim 1 wherein said resin product of methylene donor and methylene acceptor is provided as said first pre-formed initial resin product followed by said reaction with said methylene donor in situ within said rubber composition.

5. The rubber composition of claim 1 wherein said resin product of methylene donor and methylene acceptor is provided as said second pre-formed initial resin product followed by said reaction with said methylene donor in situ within said rubber composition.

6. The rubber composition of claim 1 wherein said short fiber reinforcement is comprised of polyaramid filaments.

7. The rubber composition of claim 1 wherein said particulate reinforcing filler is comprised of rubber reinforcing carbon black.

8. The rubber composition of claim 1 wherein said particulate reinforcing filler is comprised of precipitated silica together with a silica coupling agent for said precipitated silica having a moiety reactive with hydroxyl groups on said precipitated silica and another different moiety interactive with said diene-based elastomer(s).

9. The rubber composition of claim 1 wherein said particulate reinforcing filler is comprised of a combination of rubber reinforcing carbon black and precipitated silica together with a silica coupling agent for said precipitated silica having a moiety reactive with hydroxyl groups on said precipitated silica and another different moiety interactive with said diene-based elastomer(s).

10. The rubber composition of claim 1 wherein said diene-based elastomer(s) is comprised of at least one of cis 1,4-polyisoprene, cis 1,4-polybutadiene, styrene/butadiene and polybutadiene having a vinyl 1,2-content in a range of about 10 to about 90 percent.

11. The rubber composition of claim 10 wherein at least one of said diene based elastomer(s)
   (A) is a tin or silicon coupled styrene/butadiene elastomer, or
   (B) contains at least one functional group reactive with hydroxyl groups contained on precipitated silica comprised of one or more of amine, hydroxyl, carboxyl, siloxy and imine groups, or
   (C) is a tin or silicon coupled styrene/butadiene elastomer which contains at least one functional group reactive with hydroxyl groups contained on precipitated silica comprised of one or more of amine, hydroxyl, carboxyl, siloxy and imine groups.

12. A tire having a component comprised of the rubber composition of claim 1.

13. A tire having a component comprised of the rubber composition of claim 2.

14. A tire having a component comprised of the rubber composition of claim 3.

15. A tire having a component comprised of the rubber composition of claim 4.

16. A tire having a component comprised of the rubber composition of claim 5.

17. A tire having a component comprised of the rubber composition of claim 6.

18. A tire having a component comprised of the rubber composition of claim 7.

19. A tire having a component comprised of the rubber composition of claim 9.

20. A tire having a component comprised of the rubber composition of claim 11.

* * * * *